US010141747B2

(12) United States Patent
Spinella

(10) Patent No.: US 10,141,747 B2
(45) Date of Patent: Nov. 27, 2018

(54) METHOD AND AN APPARATUS FOR TRANSFERRING ELECTRICAL POWER AND DATA

(71) Applicant: EGGTRONIC S.R.L., Modena (IT)

(72) Inventor: Igor Spinella, Modena (IT)

(73) Assignee: EGGTRONIC ENGINEERING S.R.L., Modena (IT)

( * ) Notice: Subject to any disclaimer, the term of this patent is extended or adjusted under 35 U.S.C. 154(b) by 0 days.

(21) Appl. No.: 15/751,082

(22) PCT Filed: Jul. 25, 2016

(86) PCT No.: PCT/IB2016/054419
§ 371 (c)(1),
(2) Date: Feb. 7, 2018

(87) PCT Pub. No.: WO2017/025833
PCT Pub. Date: Feb. 16, 2017

(65) Prior Publication Data
US 2018/0241218 A1 Aug. 23, 2018

(30) Foreign Application Priority Data

Aug. 12, 2015 (IT) .................... 102015000044100

(51) Int. Cl.
H01F 27/42 (2006.01)
H01F 37/00 (2006.01)
(Continued)

(52) U.S. Cl.
CPC ............... *H02J 5/00* (2013.01); *H02J 50/05* (2016.02); *H02J 50/80* (2016.02)

(58) Field of Classification Search
CPC .......... H02J 50/05; H02J 50/00; H02J 50/005; H02J 50/80; H02J 50/60; H02J 50/90;
(Continued)

(56) References Cited

U.S. PATENT DOCUMENTS

2010/0087143 A1 4/2010 Bonin
2010/0090539 A1* 4/2010 Auchterlonie .......... H01J 17/36
307/106
(Continued)

FOREIGN PATENT DOCUMENTS

EP 1793307 A1 * 6/2007 ............ H02J 7/0044
JP 2009089520 A 4/2009
(Continued)

Primary Examiner — Fritz M Fleming
Assistant Examiner — Jagdeep Dhillon
(74) Attorney, Agent, or Firm — Volpe and Koenig, P.C.

(57) ABSTRACT

An apparatus for transferring electrical power and data includes a primary circuit comprising a source of electrical energy (10), at least a pair of transmitting armatures (100, 100'), a first of the armatures (100) being connected in use to a different electrical potential with respect to a second of the armatures (100'), at least an electric power transmitter (12) connected to the source of electrical energy (10) and to at least one of the armatures (100, 100'), and at least a transceiver (20) connected to at least one of the transmitting armatures (100, 100'). The transceiver (20) is particularly suitable for use in receiving and/or transmitting data via the transmitting armatures (100, 100') independently of the power transmitted by the power transmitter (12).

19 Claims, 7 Drawing Sheets

(51) Int. Cl.
*H01F 38/00* (2006.01)
*H02J 5/00* (2016.01)
*H02J 50/05* (2016.01)
*H02J 50/80* (2016.01)

(58) Field of Classification Search
CPC ........... H02J 17/00; H02K 3/00; H01H 47/00; G05F 1/10; H01J 1/00
USPC ................ 307/104, 149, 108, 66, 64, 82
See application file for complete search history.

(56) References Cited

U.S. PATENT DOCUMENTS

| | | | |
|---|---|---|---|
| 2010/0187913 A1* | 7/2010 | Smith ................ | H02J 5/005 307/104 |
| 2012/0043818 A1* | 2/2012 | Stratakos ............. | H02J 3/383 307/77 |
| 2012/0153739 A1* | 6/2012 | Cooper ................ | H02J 5/005 307/104 |
| 2013/0099807 A1* | 4/2013 | Wheeland ............ | H02J 17/00 324/713 |
| 2014/0266035 A1* | 9/2014 | Cern .................... | H02J 7/025 320/108 |
| 2014/0306552 A1* | 10/2014 | Goma .................. | H02J 17/00 307/149 |

FOREIGN PATENT DOCUMENTS

| | | | |
|---|---|---|---|
| WO | 2010103787 A1 | 9/2010 | |
| WO | 2013150352 A1 | 10/2013 | |

\* cited by examiner

METHOD AND AN APPARATUS FOR TRANSFERRING ELECTRICAL POWER AND DATA

TECHNICAL FIELD

The present invention relates in general to a method and an apparatus for transferring electrical power to one or more electrical loads and, at the same time, for transferring data between two or more devices. The electrical load or loads can be comprised internally of the devices between which the data is transferred, or can be inserted in any other distinct electrical or electronic device which is to be electrically supplied to enable it to function and/or to charge the internal batteries thereof.

Examples of devices which can require exchange of data and be simultaneously powered and/or recharged comprise mobile telephones, tablets, computers, hard disks, solid-state memories, routers and modems, switches, access points, tracking devices, keyboards, electronic books, video cameras, cameras, satellite navigators, televisions, reproduction systems of multimedia or audio contents, docking stations, audio hi fi plants, home theatres, microphones and recorders, decoders and satellite receivers, loudspeakers and record players, headphones, meteorological stations, digital frames, wearable devices such as smartwatches, drones, printers, monitors and displays, scanners, games consoles.

Other examples of devices which can require a data exchange system and transmission of electrical power can be found in the biomedical field, devices with diagnostic systems, for example for measuring blood pressure, instruments for diagnosis and treatment of pathologies, implantable devices such as pacemakers, infusers, implantable defibrillators, and many others. Examples of devices that might need to be powered and/or recharged comprise lighting systems, for example LED lighting systems, accumulating and storing systems of energy, for example power banks, batteries and storage devices, electrical domestic devices such as blenders, kitchen gadgets, coffee machines, microwave ovens and electric ovens, slicers, bread and pasta machines, juicers, vacuum cleaning systems and other systems for cleaning the home, scales, systems for personal care, for oral hygiene such as electric toothbrushes, razors, beard trimmers, hair removal devices. It is stressed that the last above category of devices, typically not requiring data connection, can in any case be improved by the possibility of exchanging data simply and economically.

PRIOR ART

The transfer of electrical power to a load has been known for some time, and one of the most broadly-used solutions is to use an AC/DC converter able to convert an alternating current (AC), generated for example by a common electrical distribution grid, into a continuous voltage (DC) suitable for powering the load. The load to be supplied can be directly connected to the AC/DC converter, for example via usual connecting wires. For greater practicability, the connection between the load to be powered and the AC/DC converter can be made by means of a mechanical system of electrical contacts having an appropriate shape, for example conductive plates, electrical connectors or contacts connected to the converter and able to be placed in contact with corresponding electrical contacts connected to the load. This contact system is usually made using a geometry that is such as always to guarantee the galvanic connection of the contacts and at least two points placed at different potentials, at the same time preventing hampering short-circuits.

Another known-type solution for transferring power to a load, starting from an electrical voltage, is to use wireless energy transmitting systems based for example on an inductive or capacitive coupling between a transmitting system and a receiving system, where the transmitting system is located on a charging device while the receiving system is located on a user device to be powered/recharged, which is separate from and independent of the charging device.

In the field of systems based on inductive coupling, a transmission antenna is typically used, for example having a reel or spiral shape, or another suitable shape, and a receiving antenna located on the user device to be powered. In this way, even without a galvanic connection between the primary circuit and the secondary circuit, it is possible to power electrical and electronic devices of various types.

Another known-type solution for transferring electrical power involves systems based on a capacitive coupling. In this case, transmitting armatures are used, for example made with conductive areas possibly isolated from the environment by dielectric material, which face towards like receiving armatures, thus constituting at least two electrical capacitances. By applying a voltage wave in inlet to the electrical capacitances, electrical power can be transmitted. Each electrical capacitance supplied with a voltage wave can in fact be considered as an impedance, so that with a voltage wave frequency that is sufficiently high and/or by means of electrical capacitances sufficiently large and/or by means of a voltage wave of a sufficiently high amplitude, it is advantageously possible to obtain in output from the couple of electrical capacitances a voltage wave that is sufficiently high to supply the load.

In order to realise a supply and/or wireless recharging system according to the capacitive coupling principle, it is advantageous for a first armature of each of the capacitances to be installed on the user device to be supplied (e.g. mobile telephone, computer, television or the like) and for the second armature of each of the capacitances to be installed on the supply device, defining thereon a suitable supply surface. In this way, by flanking the user device to the supplier device or vice versa, the armatures installed on each thereof realise the above-mentioned coupling and transmission capacitances of electrical energy.

Should the armatures be integrated into monolithic components, i.e. capacitors, the system can be effectively used as an AC DC or DC DC voltage converter in which the secondary circuit is galvanically isolated from the primary circuit due to the capacitors.

As mentioned in the foregoing, to obtain high performance by means of capacitive systems, it is generally necessary to significantly increase the voltage of the applied voltage to the transmitting armatures, and/or to increase the area of the armatures, and/or to apply to the armatures a voltage wave of a sufficiently high amplitude.

As the area of the armatures is typically constrained to the geometry of the user device and the supply surface of the supply device, or in a case of monolithic capacitors the capacitance is often dictated by safety reasons connected to the isolation of the secondary circuit by any eventual transitory voltage peaks, and since a large increase of the amplitude of the voltage would determine safety problems, as well as an increase in the sizes and costs of the system, for example because of the transformers necessary for the high voltage in play, it follows that the best way of obtaining high performance in the capacitive system is that of considerably increasing the frequency of the voltage wave applied to the transmitting armatures.

An extremely advantageous way of obtaining this result consists in the use of electrical circuits realised according to near-resonant or totally resonant layouts, in which the circuit topology and the piloting system enable minimising or almost completely eliminating the dynamic leaks in the switches, thus enabling high switching frequencies and low leakages. A category of wireless circuits which advantageously attains these objectives derive from a suitable modification of amplifiers of class E, F or E/F or in any case from the use of resonant or near-resonant circuits.

An example of this wireless supply/recharging system is described for example in international patent application published on Oct. 10th 2013 at no. WO 2013/150352.

As regards the transmission, and therefore the exchange of data, widely-used solutions of known type comprise cabled connections (for example USB, HDMI, Ethernet, Firewire, Thunderbolt, etc.) or wireless connections (for example Wi-Fi, Bluetooth, RF, zigbee, UWB, or others), with different performances in terms of distance covered, cost, consumptions and passband.

In reality it is possible to use the wireless energy transmitting systems of known type, such as for example Qi wireless battery chargers, based on an inductive coupling, for transferring other data. By modifying these systems it is possible to transfer, apart from supply, also simple information, i.e. a limited amount of data, for example information on the state of charge and/or supply, ID number of the device and the chipset, start-up information, pause, regulating the charge and/or supply, but they can also be used for transmitting more complex data packages.

One of the main drawbacks of these known systems is represented especially by the sizing of the transmitting and/or receiving inductances. In order to transmit sufficient power, these elements typically have a high inductive value, so that the data transmitting is necessarily limited to extremely small passbands.

An aim of the present invention is therefore to improve on the mentioned limitations, and in particular to realise a method and an apparatus for transfer of capacitive electrical power which enables transfer of data, in particular bi-directional exchange, with a high passband, contemporaneously with and independently of the transfer of electrical power.

A further aim of the invention is to realise a method and an apparatus for wireless transmission of the energy by means of a capacitive coupling which enables powering a plurality of devices contemporaneously, and at the same time enables data transfer between two or more devices.

A further aim of the present invention is to realise a method and an apparatus as described above that is simple and economical, in such a way that also those devices which typically do not require a data exchange system can use the apparatus and method for improving its performance and characteristics, as well as for transferring data useful for diagnostics, monitoring and control.

A further aim of the present invention is to provide an apparatus for the transfer of electrical power and data which occupies modest amounts of space, which is easy to maintain, which is simple to manage and economical to manufacture.

DESCRIPTION OF THE INVENTION

With the aim of attaining the above-mentioned aims, the apparatus for transferring electrical power and data of the present invention comprises a primary circuit comprising an energy source, at least a pair of transmitting armatures, a first of the armatures being connected in use to a different potential with respect to a second of the armatures, at least a power transmitter connected to the source of energy and to at least one of the armatures, and at least a transceiver connected to at least one of the transmitting armatures, the transceiver being particularly suitable for use in receiving and/or transmitting data via the transmitting armatures independently of the power transmitted by the power transmitter.

With this solution, it is possible to transmit electrical power generated by the power transmitter and simultaneously and independently transmit and/or receive a data signal generated and/or received by the transceiver.

In a further aspect of the invention the apparatus comprises a secondary circuit comprising at least a pair of receiving armatures, each arranged in proximity of a respective transmitting armature of the primary circuit, a load connected to the receiving armatures, and a transceiver connected to the receiving armatures, the transceiver being particularly suitable for use in receiving and/or transmitting data via the receiving armatures independently of the power transmission.

With this solution it is possible to obtain a data exchange between the primary circuit and the secondary circuit, independently and simultaneously with respect to the transmission of electrical power from the primary circuit to the secondary circuit.

In a first aspect of the invention the primary circuit comprises at least a first inductance arranged between the power transmitter and one of the transmitting armatures, and at least a second inductance arranged between the power transmitter and the other of the transmitting armatures, the inductances located upstream of the transceiver and at least a first capacitor arranged between a head of the transceiver and one of the transmitting armatures.

In a further aspect of the present invention, the primary circuit further comprises a second capacitor arranged between the other head of the transceiver and the other of the transmitting armatures.

With these solutions the performance of the primary circuit of the apparatus of the present invention can be optimised.

In a further aspect of the invention the secondary circuit comprises at least a first inductance arranged between the load and one of the receiving armatures, and at least a second inductance arranged between the load and the other of the receiving armatures, the inductances being located downstream of the transceiver and at least a first capacitor arranged between the transceiver and one of the receiving armatures, and at least a second capacitor arranged between the transceiver and the other of the receiving armatures.

With this solution the power transmitting system and the data exchange system can be made independent irrespective of the impedance characteristics of the load, the generator and the transceiver.

In a further aspect of the present invention, the power transceiver comprises at least an inductance, connected, in use, to the energy source, at least a capacitor connected on one side to the inductance, and on the other side to a lower potential with respect to the energy source, and at least a switch connected on one side to the inductance, in parallel with the capacitor and on the other side to a lower potential with respect to the energy source.

With this solution it is possible to maintain the consumption of the data exchange system negligible by virtue of the system architecture, which prevents interactions between the data exchange system and the power transmission.

In a further aspect of the present invention, each transceiver comprises a data receiving circuit and a data transmitting circuit, the output of each data transmitting circuit and the input of each data receiving circuit being connected to each first capacitor, each second capacitor being connected to a data reference voltage.

With this solution it is possible to use the apparatus of the present invention into many different modulation systems.

In a further aspect of the present invention, the secondary circuit comprises a capacitor, connected at a side to a node between the first inductance and the load, and on another side to a switch, the switch being connected to the node between the second inductance and the load.

In a further aspect of the present invention, the secondary circuit further comprises a rectifying stage connected to the load.

With this solution the apparatus can function contemporaneously as an AC/DC converter and as a wireless transmitting system.

In a further aspect of the present invention, each pair of armatures made up by at least a transmitting armature and at least a receiving armature arranged in proximity of one another are constituent parts of a single monolithic capacitor.

In a further aspect of the present invention, the primary circuit is inserted internally of a multilayer surface.

In a further aspect of the present invention, the multilayer surface comprises at least a layer containing the one or more transmitting armatures, one or more layers especially suitable in use for supplying the apparatus with the necessary supply voltage, reference voltage and data connection voltages, and one or more layers containing one or more of following components: electrical power transmitter, inductances, capacitors and transceivers.

With this solution the apparatus can be inserted in an extremely slim surface, which can be cut away as desired and functions always, even in a case of localised damage.

With the aim of attaining the above-mentioned aims, the method for transferring power and data of the present invention comprises steps of predisposing a primary circuit comprising an energy source, at least a pair of transmitting armatures, at least a power transmitter connected to the energy source and to at least one of the armatures, at least a transceiver connected to at least one of the transmitting armatures, predisposing a secondary circuit comprising at least a pair of receiving armatures, a load connected to at least one of the receiving armatures, and a transceiver connected to at least one of the receiving armatures, arranging at least a receiving armature of the secondary circuit in proximity of at least a transmitting armature of the primary circuit for determining a capacitive-type coupling between the armatures, and transferring data from the transceiver of the primary circuit to transceiver of the secondary circuit, and/or vice versa, through the at least a pair of armatures, and transferring power from the power transmitter of the primary circuit to the load of the secondary circuit, through the at least a pair of armatures independently of the data transfer.

A further aspect of the present invention further includes steps of predisposing, in the primary circuit, a plurality of transmitting armatures, a plurality of power transmitters and a plurality of transceivers, each transmitting armature being connected to at least a respective and distinct power transmitter via an inductance, and at least one of the armatures being connected to at least a respective and distinct transceiver via a capacitor, exciting the transmitting armatures arranged in proximity of the receiving armatures via the respective power transmitters and transceivers of the primary circuit for enabling transfer respectively of power and data exciting the transmitting armatures arranged in proximity of the receiving armatures via the respective power transmitters and transceivers of the primary circuit for enabling transfer respectively of power and data.

With this solution a wireless transmitting system can be set up for the electrical power and signals that is extremely functional, economical, slim, rapid and efficient, able to power even large electrical loads.

In a further aspect of the present invention, one or more of the transmitting armatures are selectively excited with a voltage wave that is variable over time, and one or more different transmitting armatures are selectively activated with a second voltage wave, different to the first.

With this solution the receiving armatures overall receive a time-variable voltage that can effectively power the load by capacitive wireless transmission, irrespective of the positioning of the receiving device on the active surface.

A further aspect of the present invention includes steps of predisposing, internally of each power transmitter, connected to a transmitting armature, a pair of switches, and selectively activating one or more different transmitting armatures by means of a voltage wave generated by activating the switches with an intermittent signal.

A further aspect of the present invention includes steps of predisposing, internally of each power transmitter connected to a transmitting armature, an inductance connected to an energy source, a capacitor connected at a side thereof to the inductance and on another side thereof to a reference potential, a switch connected to the node of the capacitor and the inductance, activating the switch of each power transmitter connected to one or more transmitting armatures arranged in proximity of a first receiving armature with a first intermittent signal, activating the switch of each power transmitter connected to one or more transmitting armatures arranged in proximity of a second receiving armature with a second intermittent signal in counter-phase with respect to the first intermittent signal.

In a further aspect of the present invention, the second signal is a constant signal or a signal having a different phase with respect to the first intermittent signal.

A further aspect of the present invention further includes predisposing, internally of each transceiver, a data receiving circuit and a data transmitting circuit, selectively activating a data transmitting circuit by modulating a wave between two voltage levels, superposing the data voltages on the power waves with no influence.

With this solution the apparatus can use bi-directional transmission modes.

A further aspect of the present invention further includes predisposing, internally of each transceiver, a data receiving circuit and a data transmitting circuit, using a different supply voltage level, primary and secondary, in each transceiver of the primary circuit and in each transceiver of the secondary circuit, so that the receiving circuit of the primary circuit distinguishes the voltage set by the transmitting circuit of the primary circuit, by reading only the voltage imposed by the transmitting circuit of the secondary circuit, and the receiving circuit of the secondary circuit distinguishes the voltage imposed by the transmitting circuit of the secondary circuit, by reading only the voltage imposed by the transmitting circuit of the primary circuit.

With this solution, the apparatus can carry out full-duplex data exchange communications with an external device and at the same time transfer electrical power thereto.

A further aspect of the present invention includes the steps of predisposing, internally of each transceiver, a data receiving circuit and a data transmitting circuit, using a single supply voltage level in each transceiver of the primary circuit and in each transceiver of the secondary circuit, supplying a data transmitting circuit on one of the transceivers of the main circuit or the secondary circuit, determining the impedance between the transmitter of the primary circuit and the receiver of the primary circuit, determining the impedance between the transmitter of the primary circuit and the receiver of the secondary circuit, determining the impedance between the transmitter of the secondary circuit and the receiver of the primary circuit, determining the impedance between the transmitter of the primary circuit and the receiver of the secondary circuit, determining which data transmitting circuit is transmitting data on the basis of the difference between the impedance determined between the transmitter and receivers and the voltage level on the receiving circuit of the secondary circuit.

BRIEF DESCRIPTION OF THE DRAWINGS

Further characteristics and advantages of the present invention will more fully emerge from the following description, made by way of example with reference to the appended figures of the drawings, in which.

BEST WAY OF CARRYING OUT THE INVENTION

Figure 1:
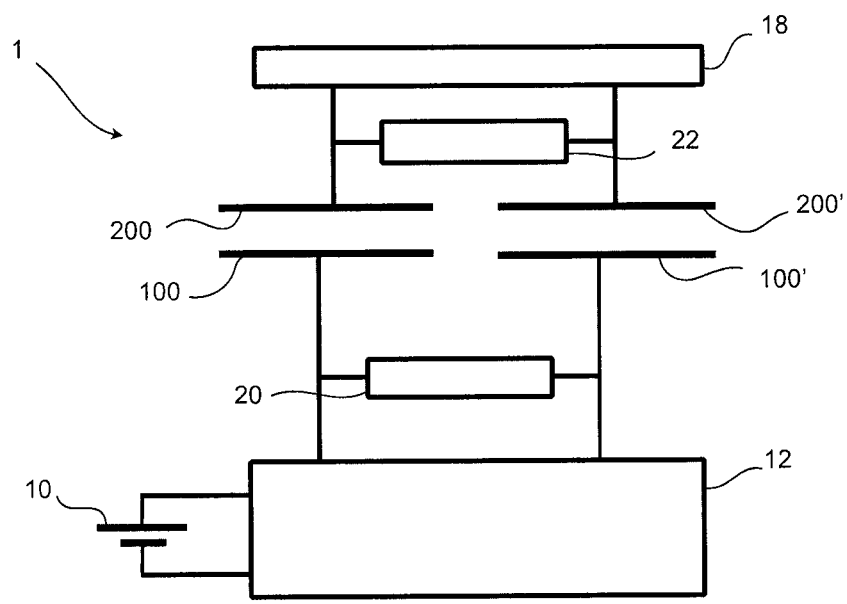
FIG. 1 is a circuit layout diagram of an embodiment of an apparatus for transferring electrical power and data according to the present invention.

With particular reference to FIG. 1, an apparatus for transferring electrical power and data includes a primary circuit comprising a source of electrical energy 10, for example a voltage generator, connected to a transmitter of electrical power 12 able to excite at least a first pair of conductive transmitting armatures 100, 100', with an electrical voltage that is variable over time at a high frequency, for example in the order of kHz, MHz or GHz. The primary circuit further comprises at least a radio frequency (RF) transceiver circuit 20, in the following termed also transceiver, arranged straddling the transmitting armatures 100, 100'. The transceiver 20 is able, in use, to inject into the circuit, independently of the transfer system of the electrical power, high-frequency electrical signals which pass through the armatures 100 and 100'.

The apparatus further comprises a secondary circuit comprising a pair of receiving armatures 200, 200' placed in proximity of the transmitting armatures 100, 100' constituting overall at least a pair of capacitances via which, as a function of the supply voltage, the excitation frequencies and the geometrical and dielectric characteristics of the capacitances, it is possible to transmit power by capacitive coupling to a load 18 arranged internally of the secondary circuit.

It is observed that here and in the following the term "load" or "loads" are used to mean any electrical element, component, circuit, apparatus, equipment or device which in order to perform its function absorbs electrical energy.

The secondary circuit further comprises at least a radio frequency (RF) transceiver 22, arranged straddling the receiving armatures 200, 200'. With this configuration it is possible to obtain a data exchange between the primary circuit, comprising the conductive transmitting armatures 100, 100' and the transceiver 20, and the secondary circuit, comprising the conductive receiving armatures 200, 200' and the transceiver 22, independently and simultaneously with respect to the transmission of electrical power from the primary circuit to the secondary circuit.

Naturally the supply to the radio-frequency transceivers 20, 22 can be independent or in common respectively with the primary and/or secondary circuit.

Further, according to a particularly advantageous characteristic, the transmitter of electrical power 12 and the load 18 must be such as to minimise the power that they absorb from the transceivers 20, 22, i.e. they must be sized so as to dispense sufficient power for transmitting the signals from one to another transceiver, avoiding excessive leaks and weakening of the signal.

In particular, the power of the transceivers 20, 22 can be particularly low when the electrical power transmitter 12 and the load 18 have inductive components sufficiently high to constitute low-pass filters which prevent the signals of the transceivers, typically having working frequencies that are much higher than a power circuit, from being absorbed by the components of the transmitting and receiving circuit of the power.

If the capacitances are constituted by discrete capacitors, the circuit thus-configured assumes the form of an isolated voltage converter (for example AC/DC, DC/DC of the step-down buck, boost or buck boost type). The data exchange system can be advantageously used also for guaranteeing a retroaction useful for controlling the output voltage of the system, ensuring galvanic insulation between the primary and secondary circuit and at the same time avoiding the need for additional data exchange systems that are more expensive, less reliable or in any case with a greater number of components, such as for example an opto-isolated transmitter or another feedback signal transmitting system which guarantees isolation between the primary and secondary circuit.

According to one from among the preferred embodiments of the present invention, the transmitting armatures 100, 100' are located on a physically separate device with respect to the receiving armatures 200, 200'. In this case, the apparatus comprises a supply device which comprises the primary circuit, i.e. the source of electrical energy 10, the conductive transmitting armatures 100, 100' and the transceiver 20, and a user device which comprises the secondary circuit, i.e. the receiving conductive armatures 200, 200', the transceiver 22 and a load 18.

The supply device can be realised as a free-standing object, for example provided with a dedicated casing, or can be integrated or applied to pre-existing structures, such as for example writing desks, tables, walls, dashboards, glove compartments, floors and others besides.

The user device can be one of those devices which can require simultaneous exchange of data and be supplied and/or recharged, or one of those devices which require only being supplied and/or recharged as indicated in the preamble to the present description.

In this embodiment, the system is configured as an apparatus useful for wireless and non-galvanically connected supply of one or more electrical and electronic apparatus, and for transmitting service information on the status and the variables of the supply, an identifying number of the devices, or other information relating to the contemporaneous transmission of power.

On the other hand, the system can also transmit data independently with respect to the transmission of power, being configured as a true and proper system useful for transferring considerable amounts of information bi-directionally between two or more devices, at the same time guaranteeing supply of one of the two devices, all wirelessly and with a slim, compact, safe and economical system.

The apparatus of the present invention offers various advantages, and in particular low cost, scalability on large surfaces, slimmer thickness, high energy efficiency and the possibly of not having theoretical passband limits with respect to common inductive antennae: since the impedance of the capacitors diminishes with the increase of frequency, there is no theoretical limit to the velocity of data exchange among the coupled devices coupled in a capacitive way. The same capacitive coupling at the same time functions as a wireless supply system of one or more devices coupled to the power transmitter, guaranteeing high power transmitted efficiently and safely.

Figure 2:
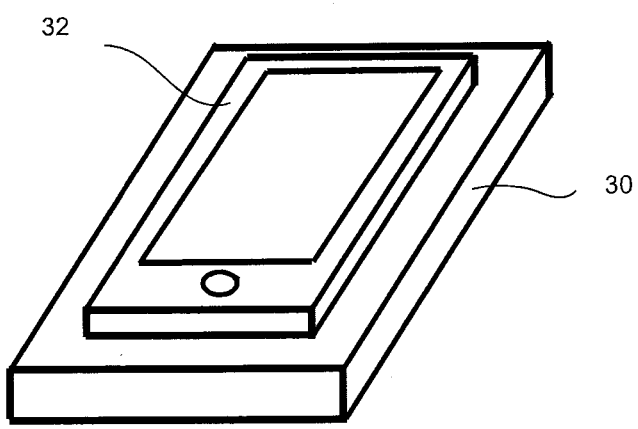
FIG. 2 is a schematic perspective view of a possible implementation of the present invention with a recharging and wireless data exchange base and an electronic device.

With particular reference to FIG. 2, one among the preferred embodiments of the present invention comprises a housing element, for example non-limitingly having a substantially flat or in any case slim shape, preferably a base 30 internally of which a transmitter of electrical power 12 is arranged, able to generate high-frequency waves, connected to at least a pair of transmitting armatures 100, 100' and a transceiver 20 positioned straddled between the two armatures, as previously described and illustrated in FIG. 1. The base 30 is functionally equivalent to a supply device.

In use various devices, such as for example a telephone 32, a tablet, a computer or another user device, can be rested on the base 30. The base 30 is connected to a source of electrical energy 10, for example, the base can be supplied by wire, with low or high voltage, AC or DC, or can be in turn supplied by a wireless supply system, or can internally contain an energy accumulator, and can be connected, via wireless or by wires, to a data transmitting system, for example, but not limitingly, USB, Ethernet, Wi-Fi, Bluetooth or the like.

In use, by resting, nearing or placing a device 32 on the base 30, a capacitive type coupling is determined between the transmitting armatures 100, 100' of the base 30 and the receiving armatures 200, 200' of the device 32, so as to enable supply and/or recharging of the device 32 and at the same time the high-velocity data transfer between the base 30 and the device 32. In fact the device 32 contains receiving armatures 200, 200', at least a load to be supplied 18 and a transceiver 22 located straddled between the armatures 200, 200'.

According to some particularly advantageous characteristics of the present invention, the base 30 can function as a bridge towards a computer of another host for wirelessly exchanging data at high velocity between a device 32, for example a telephone, a hard disk, a tablet, a camera and a host device, for example a computer and, at the same time, for charging and/or supplying the device 32, simply by resting it on the base 30. Further, the base 30 can also be a host and can contain mass memories, for example a local hard disk or network NAS, a bridge for an ethernet, Wi-Fi or Bluetooth connection, telephone networks and ADSL, GSM, GPRS, HSPA, LTE or others for connecting the base 30 to other cabled or wireless networks, and it can also contain energy storing systems, such as for example lithium batteries, so as to be able to function also in mobility.

Naturally the base can also be made with different formats and dimensions, so that it can be used to support, supply and wirelessly connect other devices, such as for example computers, tablets, electronic books and like devices. For example, the base can be integrated into tables, writing desks, articles of furniture, floors or other surfaces, so as to transform any surface into an intelligent recharging and data exchange system, leaving the aesthetic appearance unchanged.

Figure 3:
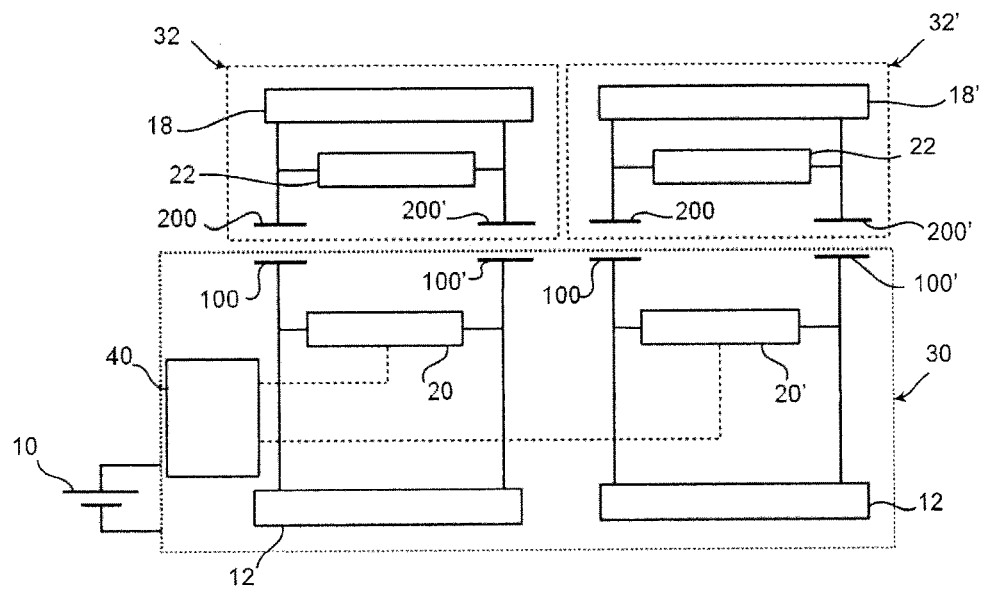
FIG. 3 is a circuit diagram of another embodiment of the present invention, comprising a plurality of devices to be supplied and interconnected.

In a further and particularly advantageous embodiment of the present invention, illustrated in particular in FIG. 3, the base 30 can also house a plurality of primary transmitting circuits in parallel, for contemporaneously supplying a plurality of devices 32, 32'. The base 30 is supplied by a source of electrical energy 10, possibly housed internally thereof, and is connected to one or more transmitters of electrical power 12 each able to excite at least a first pair of conductive transmitting armatures 100, 100', with an electrical voltage that is variable over time at high frequency (for example in the order of kHz, MHz or GHz). The base further comprises due transceivers 20, 20', each connected respectively to two of the transmitting armatures 100, 100', by injecting into the circuit, independently of the transfer system of the electrical power, high-frequency electrical signals useful for exchanging data.

The two transceivers 20, 20' can preferably, though not necessarily, be connected to a single management system of transceivers 40, useful for interconnecting by wireless capacitive coupling all the devices 32, 32' rested on the base 30, realising a network among devices and a recharging system that are independent, rapid and wireless.

Each device naturally comprises a secondary circuit comprising at least a pair of receiving armatures 200, 200', a load 18 and at least a transceiver 22 respectively.

Tests conducted by the Applicant have shown how it is possible to optimise the performance of the circuit illustrated in FIGS. 1 and 3. In particular, the best results have been obtained when the load 18 has high impedance to the functioning frequencies of the data transmitting system, for example inductive load, the electrical power transmitter 12 has high impedance to functioning frequencies of the data transmitting system, and the transceivers 20, 22 have high impedance to the functioning frequencies of the transmitting system of electrical power 12.

Figure 4:
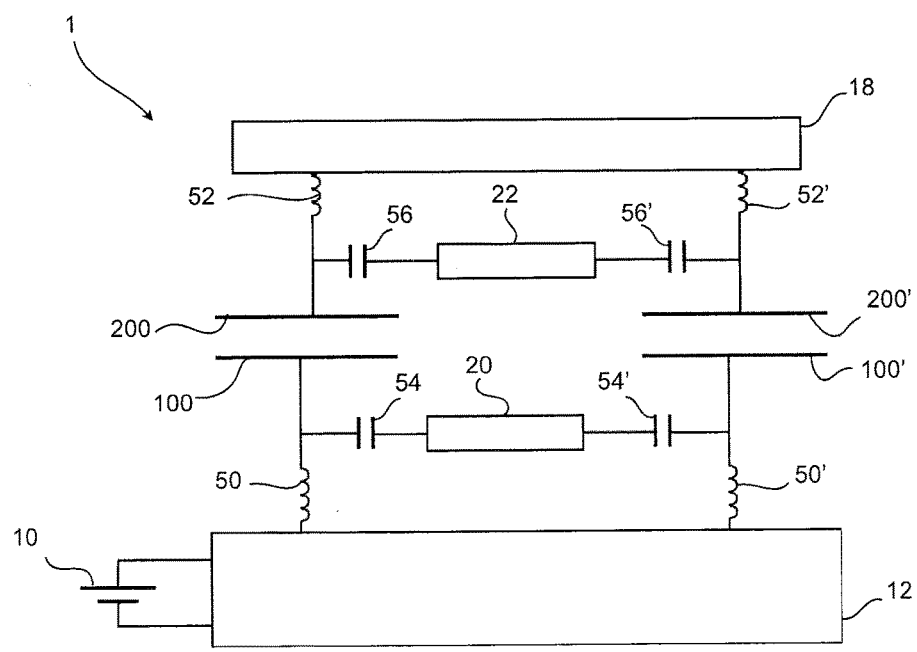
FIG. 4 is a circuit diagram of another embodiment of the present invention.

In the light of these results, one of the embodiments of the present invention illustrated in FIG. 4, and extendable likewise to the embodiment of FIG. 3, comprises, in addition to what was previously described for the circuit of FIG. 1, of which the description is incorporated herein, also a pair of inductances 50, 50', each connected between the electrical power transmitter 12 and one of the conductive transmitting armatures 100, 100' upstream of the transceiver 20, along the electrical power flow generated by the transmitter 12 in the primary circuit. Likewise, a pair of inductances has been inserted into the secondary circuit 52, 52' immediately before the load 18, downstream of the transceiver 22 along the power flow received by the load 18.

Further, a pair of capacitors 54, 54' has been interposed between the transceiver 20 and the transmitting armatures 100, 100' and the transceiver 22 and the receiving armatures 200, 200' on the primary circuit and a pair of capacitors 56, 56' has been interposed on the secondary circuit, all of small capacity, for example pF, tens or hundreds of pF.

This circuit layout brings considerable advantages, among which, for example, the fact that at the typical operating frequencies of the transmitting system of the electrical power 12, typically from hundreds of kHz to hundreds of Mhz, the inductances 50, 50' of the primary circuit 52, 52' and of the secondary circuit can have small influence on or can be an integral part of the power transmitting system, typically creating or facilitating a resonance or an almost-resonance together with the capacitances which are formed by flanking the transmitting armatures 100 of the primary circuit and the receiving armatures 200 of the secondary circuit, or together with other reactive components of the circuit.

Further, at the typical operating frequencies of the data exchange transceivers 20, 22, typically GHz or tens of GHz, or in any case frequencies much higher than the power transmitting system, the inductances 50, 50' of the primary circuit and the inductances 52, 52' of the secondary circuit constitute open circuits, thus preventing power leaks of the data signals respectively on the electrical power transmitter 12 or on the load 18.

Further, at the typical operating frequencies of the wireless power transmitting system, the small capacitances 54, 54' and 56, 56' which separate respectively the transceivers 20, 22 from the main branches, constitute open circuits, i.e. isolating capacitances, preventing the power being transmitted from the electrical power transmitter 12 to the load 18 from being dissipated also onto the transceivers 20, 22.

Lastly, at the typical operating frequencies of the wireless data transmitting system, the small capacitances 54, 54' and 56, 56' constitute short-circuits, which enable the data signals transmitted by the transceivers 20 and 22 to be injected respectively on the main transmitting armatures 100 and on the receiving armatures 200 and to reach the opposite transceiver.

To sum up, the above-described configuration enables making the power transmitting system and the data exchange system independent regardless of the impedance characteristics of the load 18, the generator 12 and the transceivers 20, 22, enabling the transmitting armatures 100, 100' to transmit power and data contemporaneously to the armatures 200, 200' and therefore to the whole secondary circuit, and lastly avoiding leakage of energy and dimensioning the transceivers 20, 22 so as to guarantee maximum operating velocity and data transfer with minimum consumption.

Figure 5:
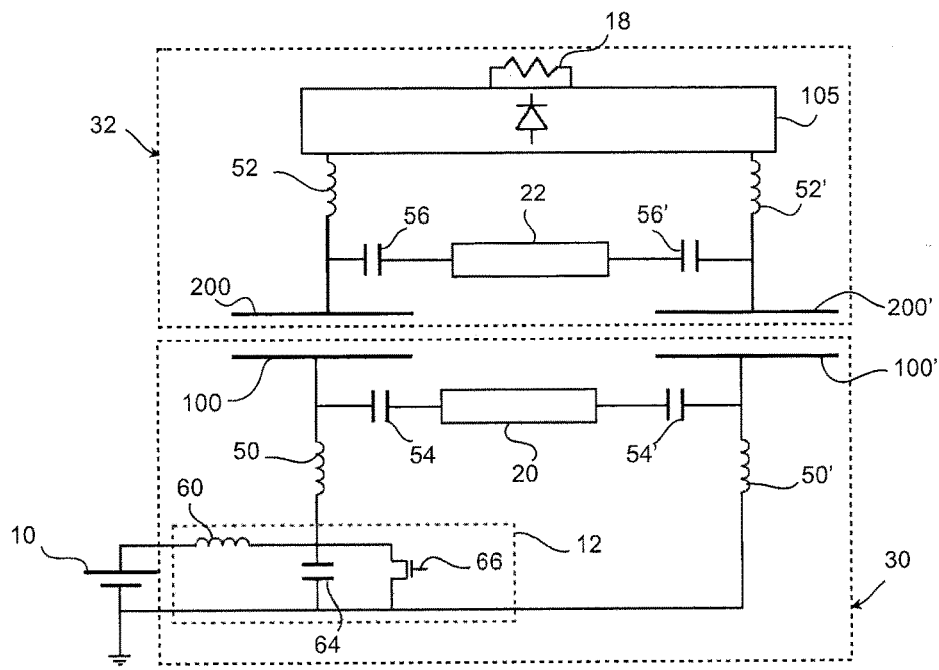
FIG. 5 is a circuit diagram of the embodiment of FIG. 4 with particular reference to the transmitter of electrical power.

With particular reference to FIG. 5, as well as the elements illustrated in the previous figures, the description of which is incorporated herein for ready reference, a generator 12 will now be described which can be used for generating the high-frequency voltage waves for exciting the armatures effectively for wireless transmission of power, combined with a transceiving system of the data.

Overall the data transceiving system consists of at least a pair of transceivers 20 and 22 connected respectively one to the primary circuit and the other to the secondary circuit. In a possible particularly advantageous implementation, the electrical power transmitter 12 comprises a circuit comprising a supply inductor 60, supplied with an electrical voltage coming from a source of electrical energy 10, for example from a battery, a possibly rectified AC voltage or a voltage generator. In use, the inductor 60 functions as a voltage generator for the rest of the power transmitter, and can be dimensioned appropriately for more or less accurately nearing that idealisation.

A storage capacitor 64 is connected to the inductor 60 in parallel with a switch 66, for example but not limitingly MOSFET, BJT, IGBT, relay, solid state relay or another type of switch. The other head of the capacitor 64 and the switch 66 are connected to the lower potential, for example ground.

It is stressed that the capacitor 64 can be omitted or minimised, for example by exploiting the intrinsic parasite capacity of the switch 66, and the circuit can include appropriate reactance values to replace the capacitor 64; also reactances in series can be included with the switch 66 for improving the performance and energy efficiency of the circuit.

The inductance 50 and the armature of the transmission 100 of the primary power transmitting circuit are connected to the node connecting the inductance 60, the capacitor 64 and the switch 66. The primary circuit further comprises a second transmitting armature 100' connected to a second inductance 50', the second inductance being connected to a lower potential, for example ground.

Lastly, the transceiver 20 is connected via the capacitor 54 to the node between the inductance 50 and the transmitting armature 100 and by the capacitor 54' to the node between the inductance 50' and the transmitting armature 100'.

The user device 32 comprises a secondary circuit comprising two receiving armatures 200, 200' respectively facing the transmitting armatures 100 and 100' constituting in this way a pair of capacitances able to transmit electrical power from the primary circuit to the secondary circuit and data bi-directionally between the primary circuit and the secondary circuit and a pair of inductances 52, 52' in series respectively with the receiving armatures 200 and 200'. In the secondary circuit, the transceiver 22 is connected via the capacitor 56 to the node between the inductance 52 and the transmitting armature 200 and is connected via the capacitor 56' to the node between the inductance 52' and the transmitting armature 200'.

This configuration enables a bi-directional data transmitting that is continuous over time, independently of the transmitting system of the wireless power, via the armatures 100, 100', 200, 200' used for the power transmission, while maintaining the consumption of the data exchange system negligible by virtue of the system architecture, which prevents interactions between the data exchange system and the power transmission.

The secondary circuit further comprises a load 18 to be supplied connected to the inductances 52, possibly including a predetermined rectification stage 105 and possibly voltage conversion stages, for example DC DC, or a battery-charging circuit.

By appropriately sizing the values of the inductances 50, 50', 52, 52' and the transmitting armatures 100, 100' and the receiving armatures 200, 200' of the capacitor 64 and the inductance 60, a power transmitting circuit is created, typically resonant at one or more frequencies. This circuit possesses a high energy efficiency as it is dimensioned so as to guarantee the switchings on and off of the switch in nil current or voltage conditions, as similarly occurs, for example, in class E, E/F and F amplifiers or in ZVS/ZCS resonant or near-resonant converters typically with extremely high operating frequencies, for example greater than Mhz, tens of Mhz or even greater than hundreds of Mhz. In this way the dimensions can be significantly reduced, indeed miniaturised, of the components while still achieving high densities of transmitted power as a function of the area of the transmitting and receiving armatures.

The presence of the inductances 50, 50', 52, 52' further enables contemporaneously transmitting data through the transmission capacitances formed by the armatures 100, 200 and 100', 200' without the transceivers 20, 22 requiring high powers, as the inductances function as blocking lowpass filters which prevent data modulations, typically at high frequencies, from being absorbed by the load 18 or by the electrical power transmitter 12.

Likewise the capacitances 54, 54' and 56, 56' prevent the power transmitter from interfering with the transceivers by transferring power thereto. As the frequency of the signals given is greater than the frequency of the power transmitting system, for example tens or thousands of Mhz or Ghz, as typically happens in modern wireless communication systems, the capacitances 54, 54', 56, 56' enable transmission of data on the power branch with no interaction of the power transmitter with the data exchange system.

In this way a wireless transmitting system can be established for the electrical power and signals that is extremely functional, economical, slim, rapid and efficient, able to supply even large electrical loads, for example smartphones, tablets, computers, televisions, hard disks etc., and interconnect them via a simultaneous and independent data exchange system that is economical, rapid and safe.

In a further characteristic of the present invention, if the source of electrical energy 10 is an alternating current source, for example the common AC network voltage, the apparatus can also comprise a stage of rectification and possibly stabilisation of the voltage upstream of the electrical power transmitter 12, becoming a system that functions contemporaneously as an AC/DC converter and a wireless transmitting system. In this way the galvanic isolation between the primary and the secondary circuit can be guaranteed and the contemporaneous exchange of data between the two parts of the circuit can be enabled, both for personal data, for example user data contained on the device, such as photographs, videos, and data useful for the devices, for example for guaranteeing transmission of retroactive signals or other signals between the primary and the secondary circuit of the AC/DC converter, for example a voltage signal on the secondary circuit useful for regulating the switching-on of the switch on the primary circuit. The apparatus of the present invention is therefore particularly advantageous from the point of view of simplicity, efficiency, sturdiness and miniaturisation.

Further if useful, for example in a case of use of high-tension supply voltages, it is possible to increase the safety level of the circuit by including, in series with the transmitting armatures 100, 100', further galvanic isolation capacitances, thus reducing the tension on the transmitting armatures 100, 100'.

Figure 6:
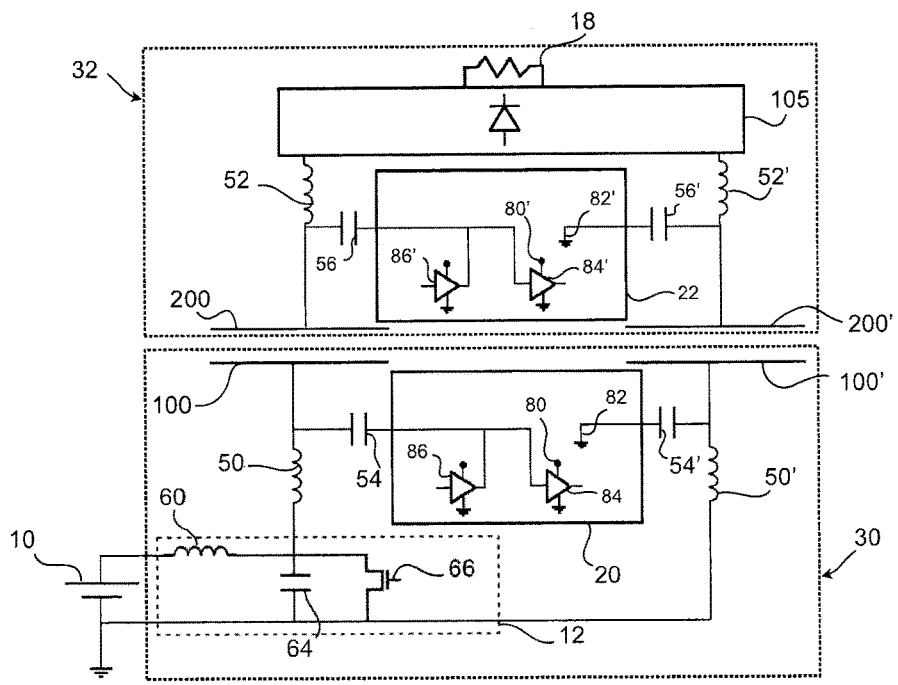
FIG. 6 is a circuit diagram of the embodiment of FIG. 5 with particular reference to a transceiver.

With particular reference to FIG. 6, a description will now be made of one from among the further embodiments of the present invention, with particular reference to a transceiver 20, 22 arranged respectively in the primary circuit of the supply device and in the secondary circuit of the user device. As is clearly visible, many of the components illustrated in FIG. 6 correspond to the elements illustrated in the preceding figures, of which the description is incorporated herein for ready reference, and for which the same reference numerals are used. Also note that each data transceiver system can equally be on the primary and secondary circuit, as the system is totally symmetrical and bi-directional.

Each data transceiving system comprises, for example, a data receiving circuit 84 and a data transmitting circuit 86 for the transceiver 20 located on the primary circuit, and a data receiving circuit 84' and a data transmitting circuit 86' for the transceiver 22 located on the secondary circuit. On the primary circuit the output of the data transmitting circuit and the input of the receiving circuit are both connected to the capacitance 54, while the other capacitance 54' is connected to a data reference voltage for closing the data circuit. In particular, the transmitting circuit 86 and the receiving circuit 84 both comprise a reference input 82 connected to a primary data reference voltage and a supply input 80 connected to a primary data supply voltage. On the secondary circuit the output of the data transmitting circuit and the input of the receiving circuit are both connected to the capacitance 56, while the other capacitance 56' is connected to a secondary data reference voltage for closing the data circuit. Likewise, the transmitting circuit 86' and the receiving circuit 84' both comprise a reference input 82' connected to a secondary data reference voltage and a supply input 80' connected to a secondary data supply voltage. The receiving circuit 84, 84' can be for example constituted by a resistance or another reading impedance, and possibly other buffering, comparative, amplification and conditioning stages of the signal based for example on comparators op-amps, bjts, mosfets, CMOS or other reading stages, typically able to read high-frequency signals (GHz, tens or hundreds of Ghz). The output of the reading circuit are the data received, usable for the most disparate purposes.

Likewise the transmitting circuit 86 receives a data flow from the system from any source, typically high-frequency, and injects it on the capacitances 54 and therefore into the circuit. The transmitting circuit 86 can be made for example by RF transistors, BJT type, MOS, CMOS pairs, or another equivalent system able to generate high-frequency signals, in combination with resistances, capacitances, inductances or other impedances useful for realising a data transmitting system.

The transmitting circuit 86' and receiving circuit 84' of the secondary circuit function in the same way as the transmitting circuit 86 and receiving circuit 84 of the primary circuit.

The data reference voltages, primary and secondary, and the data supply voltages, primary and secondary, are totally independent of one another and with respect to the supply voltages of the remaining parts of the circuit. For the sake of simplicity these voltages can coincide, but this is not a necessary requisite for correct functioning of the system which is particularly versatile in managing the most disparate voltage levels.

As mentioned, the above-described embodiment is only one of the possible forms, and some or all the components described up to here can be replaced by other functionally equivalent components.

The apparatus described and illustrated up to now in the appended figures can be used in many different modulating systems, for example analog in amplitude or frequency, or digital. Each time a transmitting circuit 86, 86' switches on or off, there is a transmission of the signal onto the power branch, independently of the transmitting system of the electrical power. This signal propagates in all the part of the circuit comprised between the inductances 50, 52, 52', 50' and can therefore be read by any receiver, for example by the receiving circuits 84, 84', but cannot propagate on the load 18 and on the electrical power transmitter 12. Likewise, a signal transmitted by the transceiver located on the secondary circuit can be read by the transceiver located on the primary circuit, and cannot propagate on the load 18 and on the transmitter of electrical power 12.

It is typically possible to send data packets using all the most common methods and protocols. The transceiver system can use reading and writing circuits that are extremely miniaturised and rapid, since the power required is very low, as the load and the electrical power transmitter are isolated by the inductances 50, 50', 52, 52' with respect to the data exchange zone, and because the low-frequency power waves are isolated by the transceivers via the capacitances 54, 54', 56, 56'. In this way the frequencies can be extremely high, for example of the order of Ghz, tens or hundreds of Ghz, thus enabling data exchange at velocities that are even greater than the tens or indeed hundreds of Gbps.

It is notable that the apparatus of the present invention can use bi-directional transmission modes, either half-duplex or full duplex. In the first mode, half-duplex, if a transmitting circuit 86 or 86' transmits data, all the other transmitting circuits are off and must await the end of the transmission so as to transmit data in turn. The advantage of this modality is its simplicity of implementation and its immunity to disturbances. If for example data is transmitted by modulating a square wave between two voltage waves, for example but not limitedly between 0 and 5V, logical "0" can be considered as one of the two levels and logical "1" can be the other level. As the data transmitting circuit is independent of the power transmitter, the voltages given superpose on the power waves without being influenced thereby.

Another usable method consists in considering logical "0" and "1" the transitions, high-low and low-high, and possibly using accessory clocks for creating a time-dependent synchronous type communication ("0" absence of transition in the clock cycle or vice versa).

From the above it can be seen that once the voltage of the data exchange system has been selected, a maximum distance is obtained between the two electrical statuses, in this way guaranteeing maximum immunity to disturbances.

It is alternatively possible to exploit the hardware architecture for a full duplex communication, for example using different working frequencies for the different transmitters. This method however considerably complicates the receiving circuit 84, 84' which must be provided with appropriate digital or analog filters useful for separating the signals, and makes possible states of uncertainty in the data exchange system.

A further method for guaranteeing full duplex communication without complicating the hardware of the delineated system consists in using different supply voltage levels, primary and secondary, in the transceivers 20 and 22, so that each receiving circuit 84, 84' can univocally determine the status of the communication bus, with the voltage entered on the transmitter bus of the data system of which the receiver is part being known. For example, if the transmitting circuit 86 located on the primary circuit transmits between 0 and 10V and the transmitting circuit 86' located on the secondary circuit transmits between 0 and 5V, the receiving circuit 84 can logically distinguish the voltage set by the transmitting circuit 86 by reading only the voltage set by the transmitting circuit 86. Likewise, the receiving circuit 84' can distinguish the voltage set by the transmitting circuit 86' by reading only the voltage, and therefore the data, set by the transmitting circuit 86, without undetermined states.

It is possible to further simplify the delineated full duplex communication system, for example by using one only supply voltage level to the data system supply (for example 5V). Clearly this does not means that the data supply voltages, primary and secondary, and the data reference voltages, primary and secondary, cannot continue to be totally independent but can be of equal value. This for example enables simplifying the design of the transceivers. Further, the data continues to be generated independently of the primary circuit and the secondary circuit as they are located on physically separate objects. This alternative solution exploits the fact that each signal emitted by a transmitter 20, for example the transmitting circuit 86 on the primary circuit, arrives directly to the receiver located on the same data exchange circuit, for example the receiving circuit 84 on the primary circuit, while it arrives on the receiver located on the other data exchange systems, for example on the receiving circuit 84' located on the secondary circuit, following a pathway having greater impedance. The different in impedance derives from the different pathways; in fact the capacitances 54, 54', the capacitances 56, 56 and the two transmission capacitances constituted by the coupling of the armatures 100, 200 and the armatures 100', 200' are present between a transmitter on a device and a receiver on the other device. All of this automatically determines different voltage levels on the receiving circuit 84 or 84', as a function of which transmitting circuit 86 or 86' is transmitting data, thus enabling univocally evincing the datum transmitted with a full duplex communication that is simple, effective, sturdy and fast, contemporaneously with and independently of the power transfer system.

The system functions as long as the output impedance of the transmitting circuit 86, 86' is sufficiently high, otherwise the signal of the transmitter contiguous to the receiver cancels every other signal coming from other transmitters. It is stressed that the output impedance of the transmitter 86, 86' can be appropriately calibrated, for example by introducing capacitances, resistances or inductances of an appropriate value into the transmitter 86. For example, if the transmitting circuit 86 that is a part of the transceiver 20 carries out a transition of 0-5V, and independently the transmitting circuit 86' that is part of the transceiver 22 also carries out a transition of 0-5V, if the output impedance of both the transmitting circuits 86, 86' is sufficiently high, each receiving circuit 84 and 84' will receive an overall signal deriving from the superposing of the effects of the two signals, and the effects of each signal can be distinguished from one another as they are weighed on the total impedance of the pathway of each signal. For example, considering the receiving circuit 84' located on the transceiver 22, the signal coming from the transmitting circuit 86 located on the transceiver 20 will follow a higher-impedance pathway than the signal coming from the transmitting circuit 86' located on the same transceiver 22, and vice versa.

In particular, this result can be obtained by determining the impedance respectively between the transmitter 86 of the primary circuit and the receiver 84 of the primary circuit, between the transmitter 86 of the primary circuit and the receiver 84' of the secondary circuit, between the transmitter 86' of the secondary circuit and the receiver 84 of the primary circuit, and between the transmitter 86 of the primary circuit and the receiver 84' of the secondary circuit. On the basis of the difference between the impedance determined between the transmitters 86, 86' and receivers 84, 84' and the level of voltage on the receiving circuit 84' of the secondary circuit, it is possible to determine which data transmitting circuit 86, 86' is transmitting data.

The apparatus described up to this point enables transfer of electrical power from a primary circuit to a secondary circuit, enabling, contemporaneously and independently, data exchange between the two circuits.

In particular FIG. 3 describes and illustrates how to supply and interconnect a plurality of devices at the same time, substantially by duplicating the circuit for each device to be supplied and/or interconnected. However, this solution creates recharging and/or data exchange zones dimensionally predefined and therefore not very flexible, substantially constrained to the geometry of the device and the recharging armatures and/or data exchange strictly dependent on the type of the device. For example a computer needs larger areas because of the greater power necessary with respect to a telephone, and the transmitting armatures suitable for a computer are not suitable for a telephone or a tablet.

According to a particularly advantageous characteristic of the present invention, this drawback can be obviated and an intelligent data exchange recharging surface created, i.e. able to supply and interconnect any device, independently of the dimension, the power absorption thereof, and also independently of the positioning of the devices and the number of devices on the interconnecting and supply surface.

Figure 7:
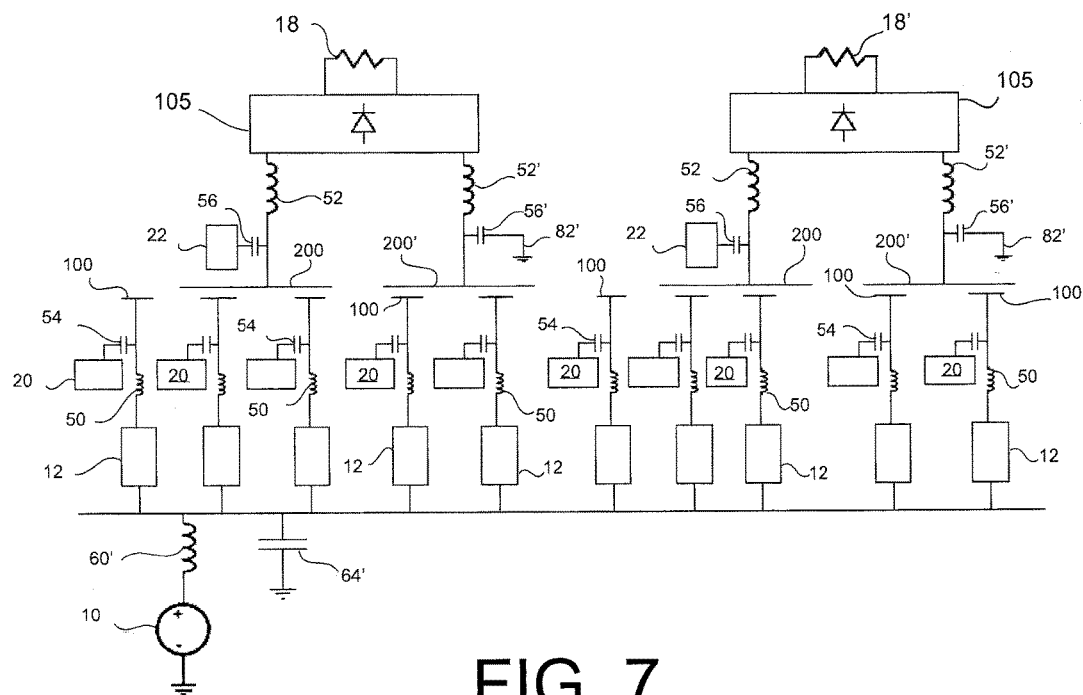
FIG. 7 is a circuit diagram of another embodiment of the present invention.

With particular reference to FIG. 7, the primary of the supply device 30 comprises a plurality of transmitting armatures 100. A capacitor 54 and an inductance 50 are connected to each transmitting armature 100. A data transceiver circuit 20 is connected to the other head of the capacitor 54, while a transmitter of electrical power 12 is connected to the other head of the inductance 50.

All the electrical power transmitters 12 are in turn connected at the other head to a source of electrical energy 10. An LC filter can be included between the electrical energy source 10 and the electrical energy source 12, which LC filter is constituted by an inductance in series 60' and by a capacitance 64', and if the electrical energy source 10 is AC (for example the normal network voltage) there can be rectifying and stabilising stages of the voltage.

One or more devices can be arranged on the plurality of armatures 100 comprised internally of the primary transmitting circuit, each of which devices constitutes a load 18, 18' able to absorb current and possibly also to receive and transmit data.

Each device is rested on the active surface constituted by the multitude of transmitting armatures 100, and is provided in turn with at least a pair of receiving armatures 200, 200'. As the receiving armatures 200 and 200' have an area that is typically greater than the dimension of the transmitting armatures 100, by resting the device at random on the active surface constituted by the multitude of transmitting armatures 100, each receiving armature 200 is located in proximity of at least a transmitting armature 100 and typically in proximity of a group of transmitting armatures 100.

The capacitances which thus form from the flanking of the transmitting armatures 100 with the receiving armatures 200, 200' enable transfer of power from the primary circuit to the secondary circuit and at the same time enable a bi-directional transfer of data between the supply device 30 and the user devices 32, 32'.

Two capacitances 56 and 56' and two inductances 52 and 52' are connected to the receiving armatures 200. A transceiver 22 is connected to the other head of the capacitances 56 and 56', while the load 18 is connected to the other head of the inductances 52, 52'. Voltage or current adapting circuits can be present between the load 18 and the two inductances 52, 52' of the secondary circuit, i.e. a rectification stage 105, comprising, for example, rectifiers, stabilisers or voltage and/or current converters.

The transmittable power will be in the first approximation proportional to the area of the secondary armatures 200, 200'. This occurs in particular if the transmitting armatures 100 have a small area with respect to the receiving armatures 200, 200', thus minimising the unexploited areas of the receiving armatures 200, 200'. In this way the area of the receiving armatures 200, 200' can easily be made proportional to the area of the device to be supplied and/or bridged including as a function of the power required. A computer will therefore have receiving armatures 200 that are more spread out than a telephone, thus covering a greater number of transmitting armatures 100 and enabling greater transmitted power.

The presence, internally of the device for supplying and/or interconnecting, of the inductances 52, 52' or another adapting network of the load, facilitates the independent tuning for each device, optimising the transfer of power for each load. Further, the inductances 50, 50' located on the primary circuit, contribute to determining the resonant frequencies and therefore the tuning of the system, thus enabling minimising the value and therefore the sizes of the inductances 52, 52' located on the secondary circuit, where size can be critical, but especially the inductances 50 are such as to prevent the signals emitted by the transceivers 20 and 22 from being absorbed by the electrical power circuits 12 or by the loads 18, as they constitute a high impedance with respect to the typical data exchange frequencies.

Figure 11:
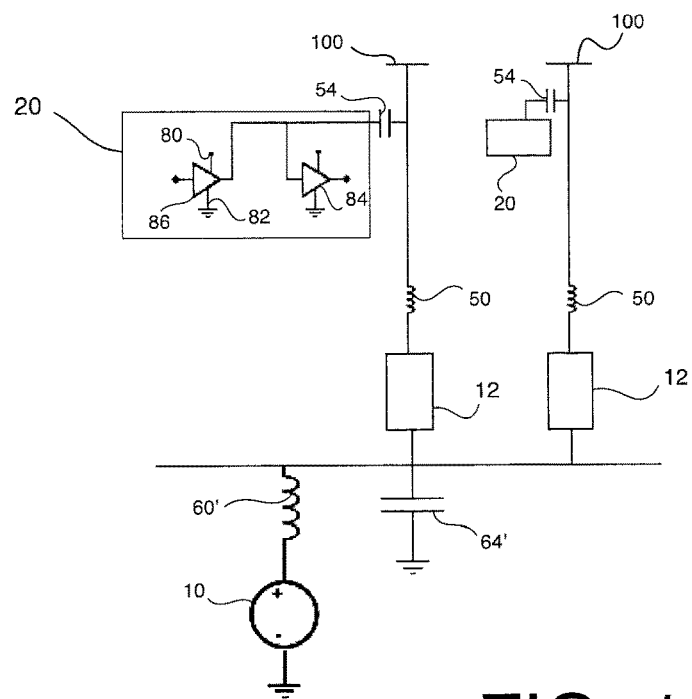
FIG. 11 is a partial circuit diagram of the transceiver of FIG. 6 applied to the circuit diagram of FIG. 7.

Likewise, the capacitances 54, 56 and 56' prevent the power waves to interact with the transceivers 20 and 22, as they are of low value and therefore of great impedance with respect to the typical operating frequencies of the power transfer system. An embodiment of the transceivers 20 and/or 22 applied to the circuit described up to this point is illustrated in FIG. 11.

In a particularly advantageous characteristic of the present invention the primary circuit can comprise a smaller number of transceivers 20 than the number of transmitting armatures 100. In particular it is possible that in the primary circuit, comprising a plurality of transmitting armatures 100, a plurality of power transmitters 12 and a plurality of transceivers 20, each transmitting armature 100 is connected to at least a respective distinct power transmitter 12, but that only one, preferably at least one, of the armatures 100 is connected to at least a respective and distinct transceiver 20. In other words, to obtain the aims and advantages of the present invention it is not necessary for each transmitting armature 100 to be connected to a respective transceiver 20.

In use, with reference to the above-described apparatus used with one device only, for simplicity of description, rested on the active surface, the electrical power circuits 12 of the supply device selectively activate only the transmitting armatures 100 above which a receiving armature 200 or 200' is located. In particular, the electrical power transmitters 12 selectively excite the group of transmitting armatures 100 located below the first receiving armature 200 of the secondary circuit of the user device with a voltage wave that is variable over time. Likewise, the electrical power circuits 12 of the supply device selectively excite the second group of transmitting armatures 100, located in proximity of the second receiving armature 200', with a second wave different from the first, for example with a different shape or phase, or with a constant voltage, for example ground. Lastly, the transmitting armatures 100 above which there is no receiving armature 200, can be kept off or connected to a constant potential, guaranteeing maximum safety, energy efficiency and minimising the electromagnetic emissions.

In this way, the receiving armatures 200, 200' overall receive a time-variable voltage that can effectively power the load 18 for capacitive wireless transmission, irrespective of the positioning of the receiving device 32 on the active surface.

By avoiding the activation of transmitting armatures 100 only partly covered by the receiving armatures 200, 200', the radiated electromagnetic emissions are minimised and the efficiency of the system is optimised. Transmitting armatures 100 having a small area with respect to the receiving armatures 200, 200' help to avoid having partially covered zones, at the same time preventing waste of area of the receiving armatures 200, 200'.

Further, it is sufficient for at least one of the transceivers 20 of the supply device connected to any one of the transmitting armatures 100 located below the first receiving armature 200 to transmit data, with a voltage or frequency modulation, and for at least one of the transceivers 20 connected to any one of the transmitting armatures 100 located below the second receiving armature 200' to be connected to a different potential (for example the data reference voltage 82), or in counter-phase with respect to the transceiver 20 arranged below the first armature 200, so that the transceiver 22 of the user device 32 can receive data. Likewise, if the transceiver 22 transmits data, any one of the transceivers 20 is able to receive the data.

Note that is not indispensable for each transmitting armature 100 to be connected to a transceiver 20; it is sufficient that they are provided with a transceiver system, a subassembly of armatures such as to guarantee that at least a transceiver 20 is located below each receiving armature 200 and 200' when a user device 32 is flanked to the active surface of transmitting armatures 100, so as to simplify the data transmitting system and make it more economical.

Note that the plurality of transmitting armatures 100 can be arranged in various and different configurations, for example matrix-fashion or more or less regular distribution on the plane or on even on non-planar surfaces of the supply device.

Figure 8:
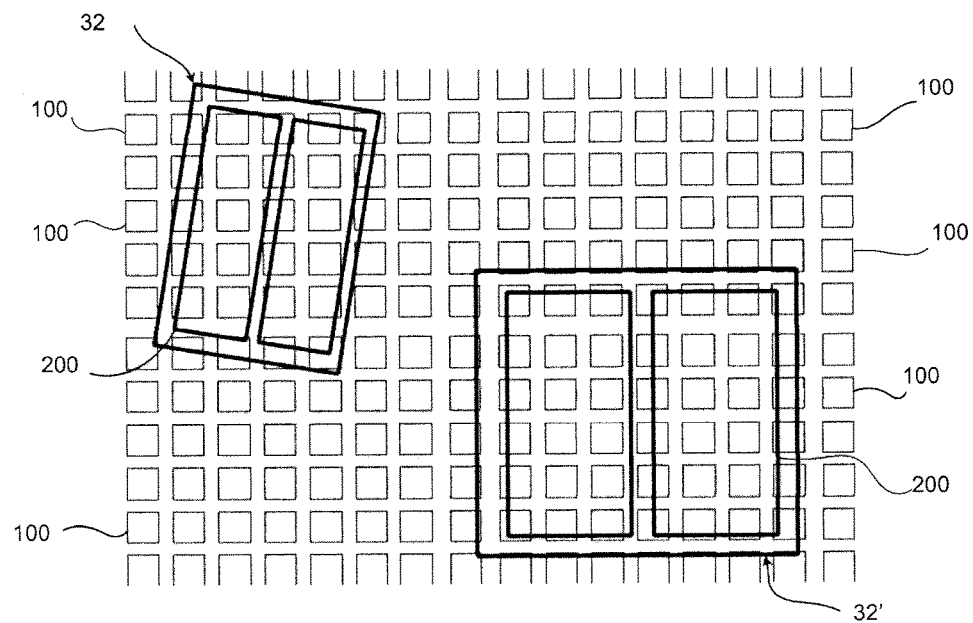
FIG. 8 is a schematic plan view of a possible implementation of the present invention according to the circuit diagram of FIG. 7.

FIG. 8 illustrates, by way of example, a possible embodiment of the present invention, in which the primary circuit is arranged internally of a housing element, preferably flat in shape, comprising an upper surface, in proximity of which a plurality of transmitting armatures 100 is arranged. The figure gives a schematic representation by way of example of the surface arrangement of the transmitting armatures 100, to which two devices 32, 32' are flanked arranged spatially in random positions. It is sufficient for at least one transmitting armature 100 to be placed below each receiving armature 200, 200' of each device 32, 32' in order to enable wireless transfer of power and data.

As previously, the electrical power transmitter 12 is also realisable according to many and different embodiments, i.e. with multiple and different types of power transmitting circuits. It is in fact sufficient for each electrical power transmitter 12 to be able to generate a sufficiently high frequency voltage wave. It is therefore possible to use switching type layouts alike to amplification layouts such as class A, B, AB, C, D, E, F, E/F, half-bridge, complete H bridge, hard-switching or near-resonant or fully resonant soft switching, zero-current switching or zero-voltage switching.

Note how the proposed layout is removed, including conceptually, from all the mentioned architectures, since it can be idealised as a multitude of transmitters in parallel, each connected to a capacitance, the second head of each of the short-circuited capacitances and connected to the load 18.

Figure 9:
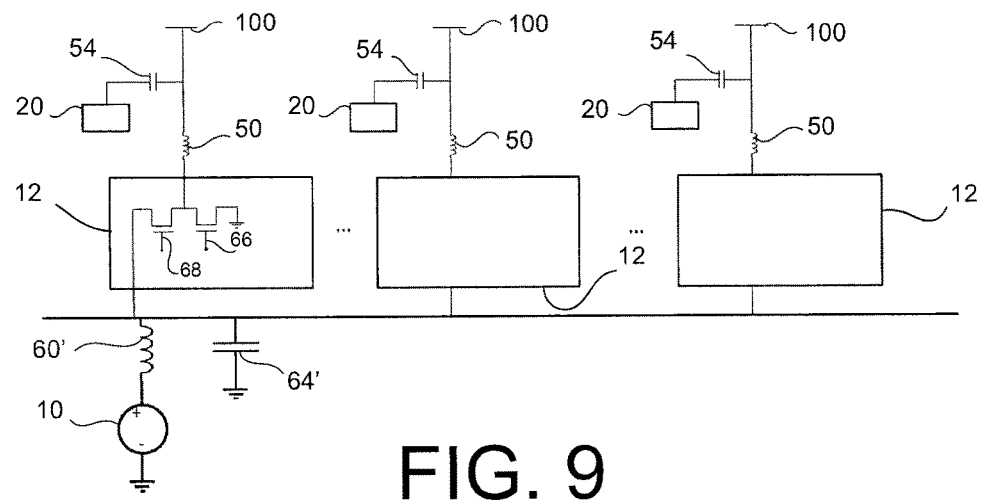
FIGS. 9 and 10 are circuit diagrams of the embodiment of FIG. 7 with particular reference to the power transmitter.

In another of the preferred embodiments according to the present invention, illustrated in FIG. 9, the electrical power transmitter 12 comprises two switches 66, 68, for example two switches chosen from the group comprising MOSFET type N, P, BJT, IGBT, CMOS pairs, relay, solid state relay, MEMS or another switch. Preferably though not necessarily the use of CMOS pairs can be particularly advantageous for simplicity of piloting or for easy integration on silicon of an array containing a large number of electrical power transmitters 12 able to pilot a vast matrix of transmitting armatures 100.

The step of piloting the armatures is substantially based on the imposing of a voltage wave, for example but non limitedly a square wave, able to alternatingly switch the switches on and off. When the high switch 68 is on the low switch 66 is off, and vice-versa. In this way it is possible to pilot each group of electrical power transmitters 12 connected to transmitting armatures 100 located in proximity of the first receiving armature 200 of each device 32, 32' flanked to the active surface constituted by the multitude of transmitting armatures 100.

The second group of electrical power circuits 12 connected to the transmitting armatures 100 located in proximity of the second armature 200' of each device 32 flanked to the active surface can be piloted by maintaining a constant potential, for example ground, obtainable by keeping the corresponding low switches 66 on, or the supply voltage, obtainable by keeping the corresponding high switches 68 on, or the second group of power circuits can be excited in phase opposition with respect to the first group, or in any case with a different phase from the first group of armatures.

Note that a careful sizing of the inductances 50 and 60, and the capacitor 64, as well as the introduction of further appropriate reactances into the circuit, enables creating resonant circuits with the capacitances formed by the transmitting armatures 100 and receiving armatures 200, 200', enabling for example transitions of the zero-current or zero-voltage switches, or in any case transitions with low leakage, in a like way to what occurs in near-resonant layouts, resonant layouts, or the like.

The adapting network of the loads can be modified by adding, removing or replacing reactive elements, without the functioning principle of the present invention being significantly altered.

A further advantageous characteristic of the present invention is that the use of many small transmitting armatures 100 enables use of particularly high working frequencies, for example tens or hundreds of Mhz, thus allowing transmitting of considerable power through small areas, while at the same time keeping the supply voltage on the transmitting armatures 100 low, to the advantage of system safety.

A further advantage of the present invention is that the inductances 50 enable passage of power from the electrical power transmitter 12 towards the transmitting armatures 100, but do not allow passage of the data signals coming from the transceivers 20 and 22, which typically have much higher frequencies, for example hundreds of Mhz, Ghz, tens of Ghz or hundreds of Ghz, towards the generator 12.

Figure 10:
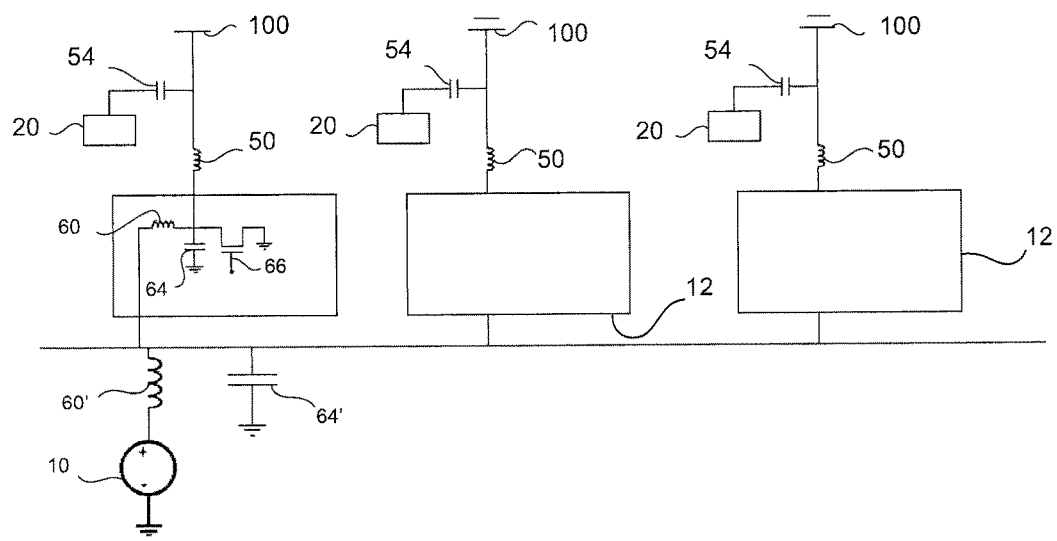

A further embodiment of the electrical power transmitter 12 according to the present invention is illustrated in FIG. 10. Each electrical power transmitter 12 comprises an inductance 60 connected to the supply circuit, a capacitor 64 connected at a side to the other inductance head 60 and at another side to a reference potential, for example ground. A switch 66 of the type selected from the group including MOSFET of type N, P, IGBT, BJT, is connected, the other terminal of which is connected to a reference potential, for example ground. An inductance 50 is connected to the same node that joins the inductance 60, the capacitor 64 and the switch 66, the other terminal of which is connected to the transmitting armature 100.

The circuit thus-realised exploits the inductance 60 as a generator of current which, in use, injects a current, in the first approximation constant, into the electrical power transmitter 12. During phases in which the switch 66 is on, the inductance 60 is recharged, while during phases in which the switch 66 is off the inductance 60 supplies the circuit.

The capacitor 64 can be physically present or its corresponding capacitance can be intrinsically present, as many switches, for example of the MOSFET type, exhibit an intrinsic parasite capacity. This capacitor 64 is useful for a correct tuning of the circuit, for minimising the leaks and for maximising the power transferred to the load.

The system, in particular, can be sized so as to guarantee resonance at one or more harmonics, for example the first, or greater harmonics with respect to the piloting frequency of the switch, thus realising a resonant amplification circuit, able to switch on and switch off the switch 134 in conditions of nil current or voltage, thus minimising leakage.

This circuit is similar to amplification layouts in class E, F, E/F or the like, and enables very high operating frequencies, in the order of tens or hundreds of MHz, or GHz, enabling low leakage, and offers piloting simplicity and low costs since only one switch 66 is present, referring for example to a ground potential, and is therefore simple to pilot.

This new circuit layout, specific for this type of application, adds greater flexibility to the advantages typical of resonant amplifiers and classic ZCS and ZVS circuits, by virtue of the fact of selectively activating each switch 66, easy integratability even on silicon and a perfect adaptability to a wireless power and data transmitting system based on a capacitive coupling, independent of the positioning of the device to be supplied and interconnected on the recharging surface.

In use, the piloting of this circuit is done by activating the switch 66 of each power transmitter 12 connected to one or more transmitting armatures 100 arranged in proximity of the first receiving armature 200 of each device 32 with an intermittent signal. For example, in resonant systems piloting through a square wave with a duty cycle of 50%, or another duty cycle, is often advantageous. At the same time, the switches of the transmitting armatures 100 located in proximity of the second receiving armature 200 of each device 32 are piloted with an intermittent signal in counter-phase with respect to the first group of switches, or with a constant signal. Should the tuning by such as to guarantee almost-resonance, or to avoid and/or not enable resonance, the switches 66 can be piloted with duty cycles even very distant from 50%.

In all the illustrated systems the control of the electrical power transmitted to the load can be fundamental. With respect to the other architectures, the systems proposed can be used for various control modes, and specifically:

regulating the duty cycle, for example in a case of half-bridge or complete H bridges, or other layouts based on switching amplifier circuits in class D, possibly of the near-resonant soft switching type.

regulating the input supply voltage coming from the source of electrical energy 10;

regulating the tuning, introducing a predetermined reactive network in parallel to the load, equally on the primary circuit or on the secondary circuit, so that it is possible to reduce and regulate the power absorbed by the load;

regulating by leaps of activating cycles of the switches; in this way resonant systems can be passed from a forced oscillation mode to free oscillations damped by the load;

regulating by selective activation of transmitting armatures, for example limiting the number of transmitting armatures active at all times for regulating the power transmitted to the load, simply and efficiently;

regulation by different activation of the transmitting armatures; regulating the load by modifying the activation mode, for example by changing the phase or statically activating, of some transmitting armatures with respect to others. This constitutes a system for modifying the overall impedance of the circuit as it adds a reactive load in parallel to the load, thus reducing the real power absorbed by the load, but without any need for adding special hardware, and therefore can be particularly advantageous.

Note that all the power regulating systems reported in the present description are adaptable both to the diagrams of FIGS. 1, 3, 4, 5, 6 but also to the matrix diagrams of following FIGS. 7, 9, 10.

Each transceiver 20, 22 can be realised by any transceiver system based on the generation of very high-frequency signals (typically GHz) which instead of being conveyed on an antenna are directed onto the transmitting armatures 100 of the supply device flanked to the receiving armatures 200, 200' of the user device.

The presence of the inductances 50 and 52, 52', like the presence of the capacitances 54 and 56, 56', prevents the transceiver from having to be sized for high power, as the transceiver energy is totally conducted through the capacitances, which are approximable to short-circuits at the typical working frequencies of the transceiver, but is neither radiated, as happens in normal wireless communications based on antennae, with significant leakage, nor dissipated on a load or transmitter of electrical power 12, to the advantage of the miniaturisation of the circuit and therefore the reduction in costs and the increase of the working speed.

The same layouts exhibited in the preceding figures, for example in FIG. 6, can be used advantageously for realising data transceivers 20, 22.

Each data transceiving circuit is composed for example of a data receiving circuit 84 and a data transmitting circuit 86. The output of the data transmitting circuit and the input of the receiving circuit are both connected to the capacitance 54. Both the transmitting circuit and the receiving circuit both comprise a reference input 82 connected to the data reference voltage and a data supply input 80 connected to a data supply voltage. The receiving circuit 84, 84' can be for example constituted by a resistance or another reading impedance, and possibly other buffering, amplification and conditioning stages of the signal based for example on comparators p-amps, bjts, mosfets, CMOS or other reading stages, able to read high-frequency signals (GHz, tens or hundreds of Ghz). The output of the reading circuit are the data received, usable for the most disparate purposes.

Likewise the transmitting circuit 86 receives a data flow from the system from any source, typically high-frequency, and injects it on the capacitances 54 and therefore into the circuit. The transmitting circuit 86 can be made for example by RF transistors, BJT type, MOS, CMOS pairs, or another equivalent system able to generate high-frequency signals, in combination with resistances, capacitances, inductances or other impedances useful for realising a data transmission system. As the equivalent of the capacitance 54' connected to the reference voltage 82 is absent, it is sufficient to activate one of the switches with which the transmitting circuit 86 of any transceiver 20 connected to a transmitting armature 100 flanked to the receiving armature 200' is provided, so as to connect the capacitance 54 located between the armature and the switch to the reference potential 82. Alternatively it is possible to pilot the transmitting circuits 86 connected to the transmitting armatures 100 located in proximity of the receiving armature 200 with a signal, and the transmitting circuits 86 connected to the transmitting armatures 100 located in proximity of the receiving armature 200' with the reciprocal signal, obtaining a piloting and therefore a differential signal.

As mentioned, the above-described embodiment is only one of the possible forms, and some or all the components described up to here can be replaced by other functionally equivalent components.

For the system structured in this way, all the previously mentioned considerations on the modes for operating in half-duplex or full duplex modes are valid, possibly based on various voltage levels imposed by the transmitters of the primary circuit and secondary circuit, and/or based on the different attenuation of the signal due to the difference of impedance of the pathways, like those based on various supply voltage levels of the data circuits. Therefore, this circuit enables wireless high-velocity full duplex communication, irrespective of the positioning, simultaneous with the power transmission, by flanking devices to a slim active surface that is also sturdy, economical and resistant to localised damage.

A further advantage of the delineated system is the intrinsic safety of the data: since there are no antennae required for this wireless communication, the data are not radiated into the environment, if not due to parasitic leakage of unimportant entity and in any case minimisable, thus guaranteeing the instrinsic safety of the transmitting system.

The delineated system can clearly function as a bridge towards other networks.

Figure 12:
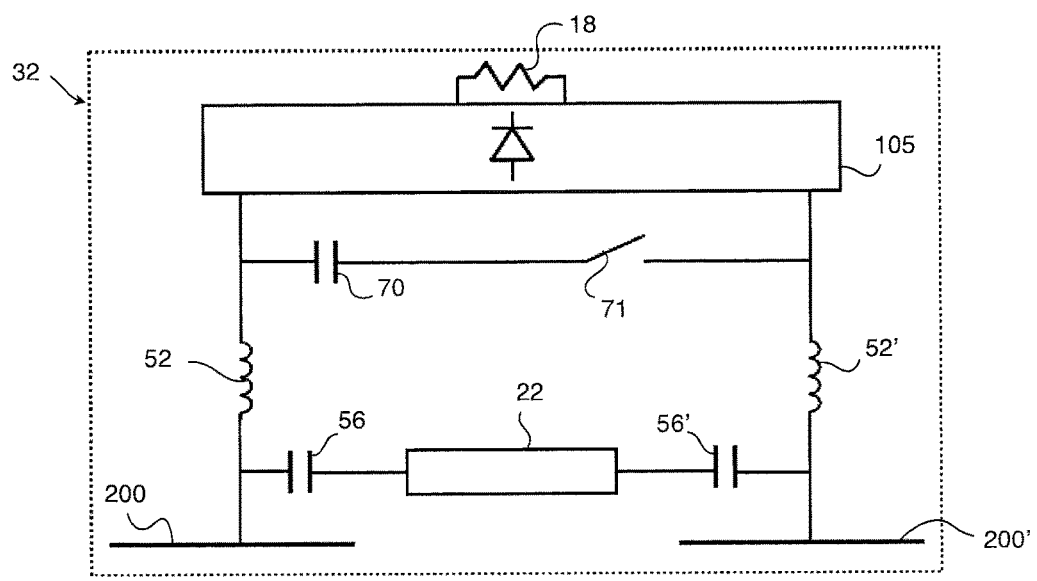
FIG. 12 is a partial circuit diagram of another embodiment of the secondary circuit.

FIG. 12 illustrates a possible regulating system of the power on the load 18. In particular, the circuit is mostly like the secondary circuit already shown in the preceding figures, for example in FIGS. 1, 3, 4, 5, 6, 7, but with respect to these comprises a capacitor 70 or another predetermined reactive network. The first head of the capacitor 70 is connected to the node between the inductor 52 and the load 18, the load being possibly preceded by a rectifying stage 105 and/or a conversion stage of the voltage. The other head of the capacitor 70 is connected to a switch (for example MOS, BJT, CMOS couple, IGBT, relay, solid state relay or another switch). Lastly, the second head of the switch is connected to the node between the inductor 52' and the load 18, the load being possibly preceded by the rectifying stage 105.

Should the switch 71 be spent, the capacitor 70 has no effect on the system, as long as the parasite capacitance of the switch 71 is sufficiently small to constitute a high impedance for the high-frequency waves coming from the generator 12.

Vice versa, when the switch 71 is on, the capacitor 70 is dimensioned so as to constitute a relatively modest impedance for the high-frequency waves coming from the generator 12. During the moments in which the switch 71 is on, it is therefore possible to reduce the power transferred to the load 18 by re-routing a part of the power coming from the primary circuit onto the reactive load constituted by the capacitor 70.

By regulating the on times of the switch 71, for example with a PWM of which the duty cycle is regulated, it is therefore possible to regulate the power transferred to the load 18 efficiently and extremely rapidly, as the regulating system is purely reactive. A further advantage of this regulating solution lies in the fact that the regulating system is entirely on the secondary circuit, and therefore eliminates the need for direct retroactions between the primary circuit and the secondary circuit. Is possible to further modify the reactive network, for example by also introducing inductive components, without the system being different from what is set out herein above.

Figure 13:
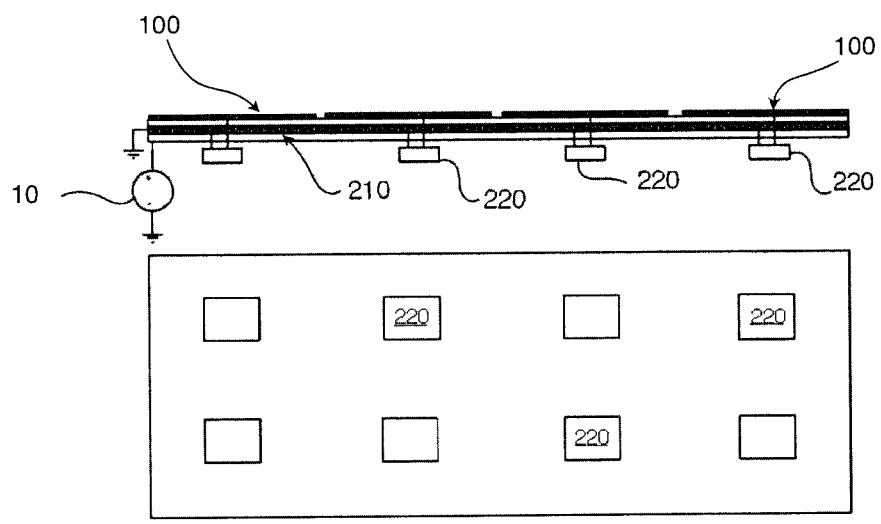
FIG. 13 is a partial view of a possible implementation of the present invention.

In a further embodiment of the present invention, the primary circuit, like any excitation component of each transmitting armature 100, inductances, data systems, capacitors and/or power transmitting systems, and possibly though not limitingly also the power transmitting system, can be mounted directly on an active surface, for example with a multilayer realisation such as the one illustrated in FIG. 13.

A multilayer surface comprises:
  at least a layer, for example but not limitingly, an upper layer containing one or more transmitting armatures 100, possible covered by further layers of dielectric material, for protection or with aesthetic aims.
  one or more layers, for example but not limitingly intermediate layers 210 which can be used for supplying all the apparatus with the necessary supply voltages, the reference voltages, for example ground, and for any other data connections, for example of the bus type among the components; and
  one or more layers, for example but not limitingly lower layers having the function of supporting one or more systems 220 each system comprising, for example, the electrical power transmitter 12, the inductances 50, the capacitors 64 and the transceivers 20.

Connections between the layers (vias) guarantee the connection of the various parts of the circuit.

In this way a typically slim surface is created, which can be shaped as desired and which always functions even in a case of localised damage, as each "island" constituted by a system 220 and by a transmitting armature 100 is totally independent of the other islands, and as the multilayer system is designed so as to prevent interruptions of the signal. In particular, each island can communicate with the others, for example for synchronising the piloting of the transmitting armatures 100, using appropriate layers of communication of the bus type (thus in which the signals are accessible in reception and transmission by all the islands), or according to a particularly advantageous alternative the transmitting armatures 100 can be exploited also as a communication channel, piloted by the transceivers 20, which as well as exchanging data with the transceivers 22, can also exchange service communications among the islands, for example on how to pilot each transmitting armature 100). This surface can be for example integrated into tables, walls, floors, shelves or other articles of furniture in order to create aesthetically unaltered structures, but able to recharge and interconnect each device simply, effectively and economically. It is sufficient to supply the surface for transforming the product which integrates it—table, wall, floor, surface or other article of furniture—into a wireless recharging and data interconnection system.

In a further and particularly advantageous characteristic of the present invention, each pair of armatures made up of at least a transmitting armature 100 and at least a receiving armature 200 arranged in proximity of one another, as described up to now, are constituent parts of a single monolithic capacitor.

All the details can be substituted by other technically-equivalent elements. Likewise, the materials used, as well as the forms and dimensions thereof, can be any according to needs without for this reason forsaking the scope of protection of the following claims.

The invention claimed is:

1. An apparatus for transferring electrical power and data including a primary circuit and a secondary circuit,
    wherein the primary circuit comprises:
        an energy source (10),
        at least a pair of transmitting armatures (100, 100'), a first of the armatures (100) being connected in use to a different potential with respect to a second of the armatures (100'),
        at least a power transmitter (12) connected to the energy source (10) and at least one of the armatures (100, 100'), and
        at least a transceiver (20) connected to at least one of the transmitting armatures (100, 100'), the transceiver (20) configured for receiving and/or transmitting data via the transmitting armatures (100, 100') independently of the power transmitted by the power transmitter (12),
        at least a first capacitor (54) arranged between a head of the transceiver (20) and one of the transmitting armatures (100), at least a first inductance (50) arranged between the power transmitter (12) and one of the transmitting armatures (100), and at least a second inductance (50') arranged between the power transmitter (12) and the other of the transmitting armatures (100'), the inductances being located upstream of the transceiver (20),
    and wherein the secondary circuit comprises:
        at least a pair of receiving armatures (200, 200') each arranged in proximity of a respective transmitting armature (100, 100') of the primary circuit,
        a load (18) connected to the receiving armatures (200, 200'), and
        a transceiver (22) connected to the transmitting armatures (200, 200'), the transceiver (22) being particularly suitable for use in receiving and/or transmitting data via the receiving armatures (200, 200') independently of the power transmission
        at least a first capacitor (56) arranged between the transceiver (22) and one of the receiving armatures (200), and at least a second capacitor (56') arranged between the transceiver (22) and the other of the receiving armatures (200'), at least a first inductance (52) arranged between the load (18) and one of the transmitting armatures (200), and at least a second inductance (52') arranged between the load (18) and the other of the receiving armatures (200'), the inductances being located downstream of the transceiver (20).

2. The apparatus of claim 1, wherein the primary circuit further comprises a second capacitor (54') arranged between the other head of the transceiver (20) and the other of the transmitting armatures (100').

3. The apparatus of claim 1, wherein the power transmitter (12) further comprises:
    at least an inductance (60) connected, in use to the energy source (10),
    at least a capacitor (64) connected on one side to the inductance (60), and on the other side to a lower potential with respect to the energy source (10), and
    at least a switch (66) connected on one side to the inductance (60), in parallel with the capacitor (64) and on the other side to a lower potential with respect to the energy source (10).

4. The apparatus of claim 1, wherein the power transmitter (12) comprises a pair of switches (66, 68).

5. The apparatus of claim 1, wherein each transceiver (20, 22) comprises
    a data receiving circuit (84, 84') and a data transmitting circuit (86, 86'),
    the output of each data receiving circuit (86, 86') and the input of each data receiving circuit (84, 84') being connected to each first capacitor (54, 56),
    each second capacitor (54', 56') being connected to a data reference voltage.

6. The apparatus of claim 1, wherein the secondary circuit further comprises:
    a capacitor (70), connected at a side to a node between the first inductance (52) and the load (18), and on another side to a switch (71),
    the switch (71) being connected to the node between the second inductance (52') and the load (18).

7. The apparatus of claim 1, wherein the secondary circuit further comprises a rectifying stage (105) connected to the load.

8. The apparatus of claim 1, wherein each pair of armatures made up by at least a transmitting armature (100) and at least a receiving armature (200) arranged in proximity of one another are constituent parts of a single monolithic capacitor.

9. The apparatus of claim 1, wherein the primary circuit is inserted internally of a multilayer surface.

10. The apparatus of claim 9, wherein the multilayer surface comprises at least a layer containing the one or more transmitting armatures (100), one or more layers (210) especially suitable in use for supplying the apparatus with the necessary supply voltage, reference voltage and data connection voltage, and one or more layers containing one or more of following components: electrical power transmitter (12), inductances (50, 50'), capacitors (54, 54') and transceivers (20).

11. A method for transferring power and data comprising steps of:
    predisposing at least a primary circuit comprising an energy source (10), at least a pair of transmitting armatures (100, 100'), at least a power transmitter (12) connected to the energy source (10) and to at least one of the armatures (100, 100'), at least a transceiver (20) connected to at least one of the transmitting armatures (100, 100'), at least a first capacitor (54) arranged between a head of the transceiver (20) and one of the transmitting armatures (100), at least a first inductance

(50) arranged between the power transmitter (12) and one of the transmitting armatures (100), and at least a second inductance (50') arranged between the power transmitter (12) and the other of the transmitting armatures (100'), the inductances being located upstream of the transceiver (20), predisposing at least a secondary circuit comprising at least a pair of receiving armatures (200, 200'), a load (18) connected to at least one of the receiving armatures (200, 200'), a transceiver (22) connected to at least one of the transmitting armatures (200, 200'), at least a first capacitor (56) arranged between the transceiver (22) and one of the receiving armatures (200), and at least a second capacitor (56') arranged between the transceiver (22) and the other of the receiving armatures (200'), at least a first inductance (52) arranged between the load (18) and one of the transmitting armatures (200), and at least a second inductance (52') arranged between the load (18) and the other of the receiving armatures (200'), the inductances being located downstream of the transceiver (20), arranging at least a receiving armature (200) of the secondary circuit in proximity of a transmitting armature (100, 100') of the primary circuit for determining a capacitive-type coupling between the armatures (100, 200), and transferring data from the transceiver (20) of the primary circuit to the transceiver (22) of the secondary circuit and/or vice versa, through the at least a pair of armatures (100, 200), and transferring power from the transceiver (12) of the primary circuit to the load (18) of the secondary circuit, through the at least a pair of armatures (100, 200) independently of the data transfer.

12. The apparatus of claim 11, further comprising:
predisposing, in the primary circuit, a plurality of transmitting armatures (100), a plurality of power transmitters (12) and a plurality of transceivers (20), each transmitting armature (100) being connected to at least a respective and distinct power transmitter (12) via an inductance (50), and at least one of the armatures (100) being connected to at least a respective and distinct transceiver (20) via a capacitor (54), exciting the transmitting armatures (100) arranged in proximity of the receiving armatures (200) via the respective power transmitters (12) and transceivers (20) of the primary circuit for enabling transfer respectively of power and data, exciting the transmitting armatures (100) arranged in proximity of the receiving armatures (200') via the respective power transmitters (12) and transceivers (20) of the primary circuit for enabling transfer respectively of power and data.

13. The method of claim 11, wherein one or more of the transmitting armatures (100) are selectively excited with a voltage wave that is variable over time, and one or more different transmitting armatures (100) are selectively activated with a second voltage wave, different to the first.

14. The method of claim 13, further comprising:
predisposing, internally of each power transmitter (12) connected to a transmitting armature (100), a pair of switches (66, 68), and
selectively activating one or more different transmitting armatures (100) by means of a voltage wave generated by activating the switches (66, 68) with an intermittent signal.

15. The method of claim 11, further comprising:
predisposing, internally of each power transmitter (12) connected to a transmitting armature (100), an inductance (60) connected to an energy source (10), a capacitor (64) connected at a side thereof to the inductance (60) and on another side thereof to a reference potential, a switch (66) connected to the node of the capacitor (64) and the inductance (60),
activating the switch (66) of each power transmitter (12) connected to one or more transmitting armatures (100) arranged in proximity of a first receiving armature (200) with a first intermittent signal,
activating the switch (66) of each power transmitter (12) connected to one or more transmitting armatures (100) arranged in proximity of a second receiving armature (200') with a second intermittent signal in counterphase with respect to the first intermittent signal.

16. The method of claim 15, wherein the second signal is a constant signal or a signal having a different phase with respect to the first intermittent signal.

17. The method of claim 11, further comprising:
predisposing, internally of each transceiver (20, 22), a data receiving circuit (84, 84') and a data transmitting circuit (86, 86'),
selectively activating a data transmitting circuit (86) by modulating a wave between two voltage levels, superposing the data voltages on the power waves with no influence.

18. The method of claim 11, further comprising:
predisposing, internally of each transceiver (20, 22), a data receiving circuit (84, 84') and a data transmitting circuit (86, 86'),
using different levels of supply voltage, primary and secondary in each transceiver (20) of the primary circuit and in each transceiver (22) of the secondary circuit, so that the receiving circuit (84) of the primary circuit distinguishes the voltage set by the transmitting circuit (86) of the primary circuit, by reading only the voltage imposed by the transmitting circuit (86') of the secondary circuit, and the receiving circuit (84') of the secondary circuit distinguishes the voltage imposed by the transmitting circuit (86') of the secondary circuit, by reading only the voltage imposed by the transmitting circuit (86) of the primary circuit.

19. The method of claim 11, further comprising:
predisposing, internally of each transceiver (20, 22), a data receiving circuit (84, 84') and a data transmitting circuit (86, 86'),
using a single supply voltage level in each transceiver (20) of the primary circuit and in each transceiver (22) of the secondary circuit,
supplying a data transmitting circuit (86, 86') on one of the transceivers of the main circuit or the secondary circuit,
determining the impedance between the transmitter (86) of the primary circuit and the receiver (84) of the primary circuit,
determining the impedance between the transmitter (86) of the primary circuit and the receiver (84') of the secondary circuit,
determining the impedance between the transmitter (86') of the secondary circuit and the receiver (84) of the primary circuit,
determining the impedance between the transmitter (86) of the primary circuit and the receiver (84') of the secondary circuit,
determining which data transmitting circuit (86, 86') is transmitting data on the basis of the difference between the impedance determined between the transmitter (86, 86') and receivers (84, 84') and the voltage level on the receiving circuit (84') of the secondary circuit.

\* \* \* \* \*